(12) United States Patent
Dong et al.

(10) Patent No.: US 11,688,965 B2
(45) Date of Patent: Jun. 27, 2023

(54) ELECTRIC CONNECTION ASSEMBLY

(71) Applicants: Tyco Electronics (Shanghai) Co. Ltd., Shanghai (CN); TE Connectivity Corporation, Berwyn, PA (US)

(72) Inventors: Litao Dong, Shanghai (CN); Ziwei Li, Shanghai (CN); Weiping Zhao, Troy, MI (US); Haifeng Liu, Kanagawa (JP)

(73) Assignees: TE CONNECTIVITY SERVICES GMBH, Schaffhausen (CH); TYCO ELECTRONICS (SHANGHAI) CO. LTD., Shanghai (CN)

( * ) Notice: Subject to any disclaimer, the term of this patent is extended or adjusted under 35 U.S.C. 154(b) by 317 days.

(21) Appl. No.: 16/549,397

(22) Filed: Aug. 23, 2019

(65) Prior Publication Data

US 2020/0067058 A1 Feb. 27, 2020

(51) Int. Cl.
*H01R 13/02* (2006.01)
*H01R 11/11* (2006.01)
*H01R 13/518* (2006.01)
*H01R 25/16* (2006.01)
*H01M 50/50* (2021.01)
(Continued)

(52) U.S. Cl.
CPC .......... *H01R 13/02* (2013.01); *H01M 50/204* (2021.01); *H01M 50/271* (2021.01); *H01M 50/50* (2021.01); *H01M 50/503* (2021.01); *H01R 11/11* (2013.01); *H01R 13/518* (2013.01); *H01R 25/16* (2013.01); *H01M 50/296* (2021.01);
(Continued)

(58) Field of Classification Search
CPC .... H01R 13/02; H01R 13/518; H01R 13/516; H01R 11/11; H01R 25/16; H01R 9/16; H01M 50/547; H01M 50/20; H01M 50/50; H01M 50/147; H01M 50/262; H01M 50/271; H01M 50/296; H01M 50/514; H01M 50/517; H01M 50/552; H01M 50/55; H01M 50/553; H01M 50/591; H01M 50/548; H01M 50/559; H01M 50/562; H01M 50/564; H01M 50/566; H01M 50/567; H01M 50/569
See application file for complete search history.

(56) References Cited

U.S. PATENT DOCUMENTS

2005/0058891 A1\* 3/2005 Marraffa ............. H01M 10/121
429/100
2011/0135970 A1\* 6/2011 Han ..................... H01M 50/502
429/7

(Continued)

*Primary Examiner* — Matthew W Van Oudenaren (57) ABSTRACT

The present application discloses an electric connection assembly having a support and a connector, wherein the support comprises a support body; the support body is provided with a mounting groove; the connector is configured to be in contact electrical connection with a mating connector; the connector comprises a mounting part; part or all of the mounting part is detachably received within the mounting groove; the support and the connector are formed separately and connected to each other. Compared with the prior art, the electric connection assembly of the present disclosure implements the function of supporting, holding and assembling integrally the corresponding connectors by means of the support provided with a mounting groove. Correspondingly, the entire structure of the electric connection assembly is simplified and convenient to be assembled.

20 Claims, 9 Drawing Sheets

(51) Int. Cl.
   *H01M 50/271* (2021.01)
   *H01M 50/204* (2021.01)
   *H01M 50/503* (2021.01)
   *H01M 50/547* (2021.01)
   *H01M 50/552* (2021.01)
   *H01M 50/296* (2021.01)
   *H01M 50/567* (2021.01)

(52) U.S. Cl.
   CPC ........ *H01M 50/547* (2021.01); *H01M 50/552* (2021.01); *H01M 50/567* (2021.01)

(56) References Cited

U.S. PATENT DOCUMENTS

| | | | | |
|---|---|---|---|---|
| 2012/0148907 | A1* | 6/2012 | Chang | H01M 50/543 |
| | | | | 429/179 |
| 2012/0288744 | A1* | 11/2012 | Guen | H01M 50/502 |
| | | | | 429/158 |
| 2013/0090000 | A1* | 4/2013 | Zhao | H01R 13/6277 |
| | | | | 439/370 |
| 2015/0064540 | A1* | 3/2015 | Roh | H01M 50/20 |
| | | | | 429/153 |

* cited by examiner

ELECTRIC CONNECTION ASSEMBLY

TECHNICAL FIELD

The present disclosure relates to an electric connection structure, and particularly to an electric connection assembly for connecting lithium batteries.

BACKGROUND

The existing electronic components, such as lithium batteries, often require corresponding electric connection assemblies to implement the corresponding electrical connections. How to implement the simplified structure and the convenient assembling of the electric connection assembly is a problem to be considered.

SUMMARY OF INVENTION

One of the objectives of the present disclosure is to provide an electric connection assembly with a simple structure and convenient to assemble to overcome the shortcomings in the prior art.

According to one aspect of the present disclosure, an electric connection assembly is provided. The electric connection assembly comprises a support including a support body provided with a mounting groove, and a connector configured to be in contact electrical connection with a mating connector. The connector comprises a mounting part. Part or all of the mounting part is detachably received within the mounting groove. The support and the connector are formed separately and connected to each other.

According to one embodiment of the present disclosure, the support body is provided with a mounting inlet at one end of the mounting groove, and the mounting inlet is configured to provide for the connector to be mounted into the mounting groove.

According to one embodiment of the present disclosure, the electric connection assembly further comprises a non-return plate provided on the support body, and the non-return plate is configured to extend into the mounting groove and to be block-fittable with the connector to block the connector from retreating out of the mounting groove via the mounting inlet.

According to one embodiment of the present disclosure, the non-return plate is detachably provided on the support body.

According to one embodiment of the present disclosure, the support body is provided with a limiting groove, and at least part of the non-return plate is inserted and fixed into the limiting groove.

According to one embodiment of the present disclosure, the limiting groove is enclosed by a limiting groove wall, the limiting groove wall is provided protrudingly with an abutting convex rib, and the abutting convex rib is provided to be in interference-fit with the non-return plate.

According to one embodiment of the present disclosure, the support body is provided with a blocking wall at another end of the mounting groove, and the blocking wall is configured to be in block-fit with the mounting part along a mounting direction of the mounting part.

According to one embodiment of the present disclosure, the support further comprises a blocking arm, and the blocking arm is provided to be block-fittable with the mounting part along an axial direction of the connector.

According to one embodiment of the present disclosure, the mounting part is provided with a stop step, and the stop step is provided to be block-fittable with the blocking arm along the axial direction of the connector.

According to one embodiment of the present disclosure, the connector is provided to be movable inside the mounting groove.

According to one embodiment of the present disclosure, the mounting part is in clearance-fit with a groove wall of the mounting groove.

According to one embodiment of the present disclosure, the support is an injection molded part.

According to one embodiment of the present disclosure, the connector comprises a bolt.

According to one embodiment of the present disclosure, the connector further comprises a protruding part, and the protruding part is provided to protrude on the mounting part along an axial direction of the connector.

According to one embodiment of the present disclosure, the connector further comprises a supporting step which is disposed along a radial direction of the connector to contact and support a mating connector.

According to one embodiment of the present disclosure, the support is a battery module cover plate.

According to one embodiment of the present disclosure, the electric connection assembly further comprises a plurality of mating connectors, wherein the mating connectors are busbars that are fixed on the support body and configured to be electrically connected to a plurality of cells, and one of the plurality of the busbars is electrically connected to the connector.

According to one embodiment of the present disclosure, the electric connection assembly further comprises an output connector that is in contact electrical connection with the busbar, and a fastener that is securely provided on the connector and allows the busbar and the output connector to abut against and connect with each other.

According to one embodiment of the present disclosure, the connector is one integral piece.

According to one embodiment of the present disclosure, the connector is an insert injection molded part.

Compared with the prior art, the electric connection assembly of the present disclosure implements the function of supporting, holding and assembling integrally the corresponding connectors by means of the support provided with a mounting groove. Correspondingly, the entire structure of the electric connection assembly is simplified and convenient to be assembled. Particularly, the electric connection assembly, as compared to an integral piece formed from a support and a connector by insert injection molding for example, may avoid issues such as fixed and inflexible mounting position of the connector due to reasons such as tolerance. Correspondingly, the electric connection assembly conveniently enables components such as cells to be securely and stably assembled and fitted, thereby having a relatively strong universality.

DETAILED DESCRIPTION OF EMBODIMENTS

The present disclosure will be described below in detail with reference to the accompanying drawings.

Embodiment 1

Figure 1:
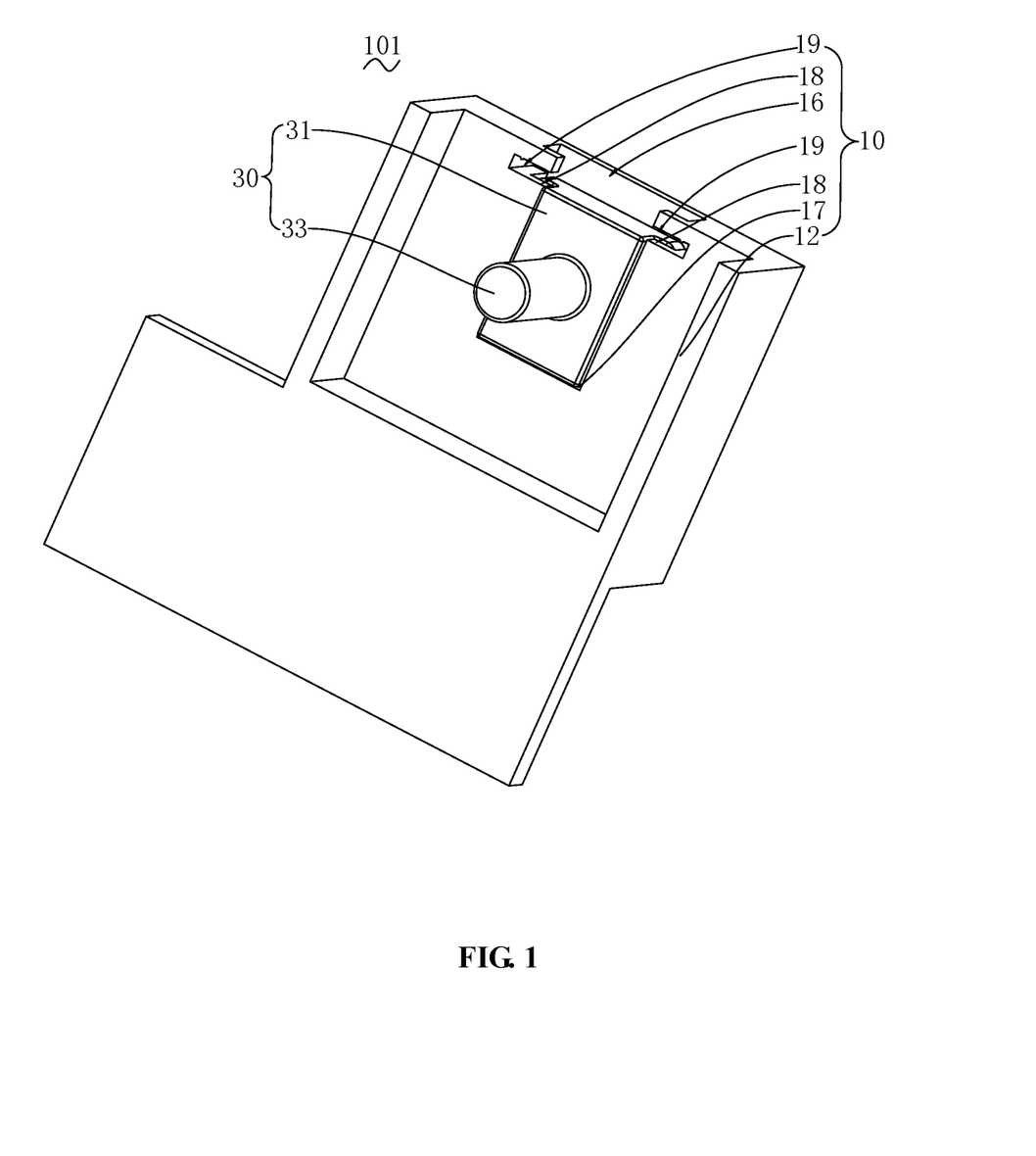
FIG. 1 is a stereoscopic structural schematic diagram of an electric connection assembly provided by the present disclosure.

Referring to FIG. 1, an electric connection assembly 101 provided by the present disclosure is shown. The electric connection assembly 101 comprises a support 10 and a connector 30. The connector 30 is provided on the support 10 and may be in contact electrical connection with a mating connector 70.

Figure 2:
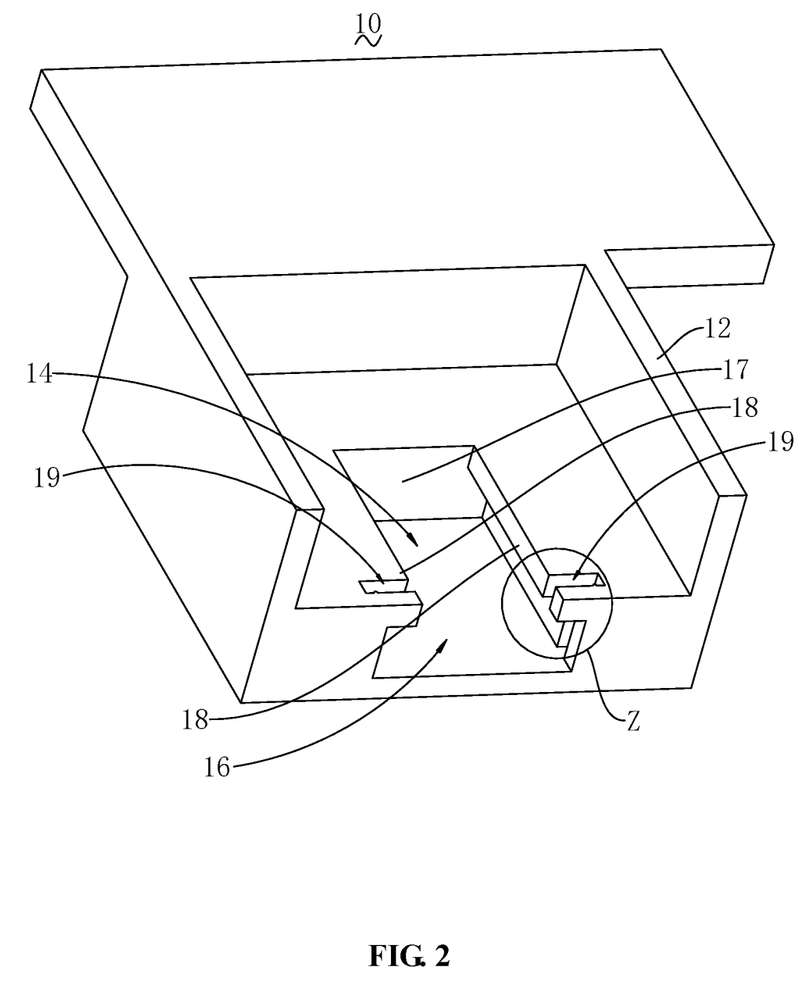
FIG. 2 is a stereoscopic structural schematic diagram of a support in FIG. 1.
Figure 3:
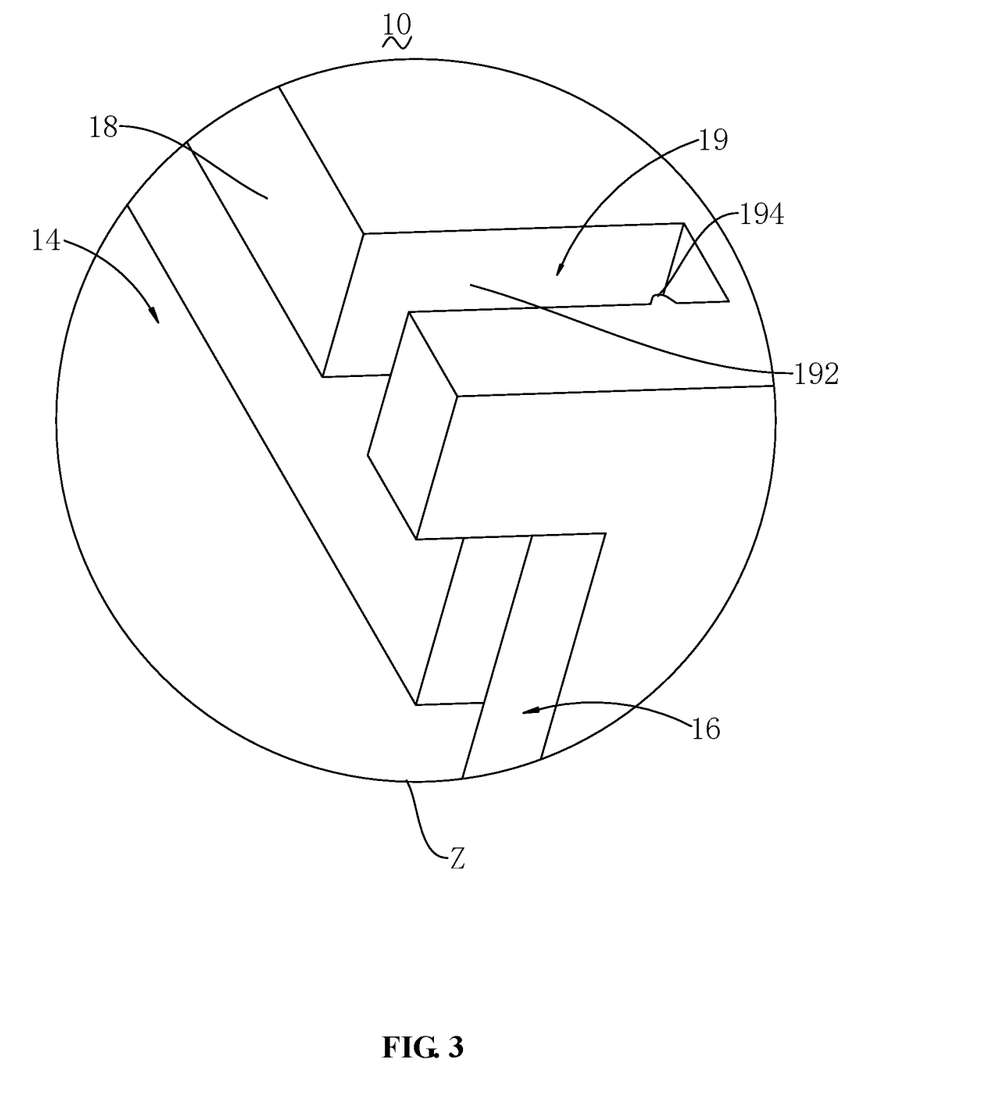
FIG. 3 is a partial enlarged schematic view of the support of FIG. 2 at position Z.

Referring to FIGS. 2 and 3, the support 10 is configured for supporting and mounting the connector 30. The support 10 comprises a support body 12. The support body 12 may be configured for supporting an external electronic element. The specific shape and structure of the support body 12 may be selected according to needs. In this embodiment, the support 10 is a battery module cover plate. Correspondingly, the support body 12 is substantially plate-shaped. The support body 12 is provided with a mounting groove 14. The specific shape and configuration of the mounting groove 14 are only required to be capable of accommodating and holding the connector 30. In this embodiment, the mounting groove 14 is substantially a cuboid space.

To further facilitate mounting and dismantling, the support body 12 is provided with a mounting inlet 16. The mounting inlet 16 is provided to be in communication with the mounting groove 14. The mounting inlet 16 provides for the connector 30 to be mounted into the mounting groove 14. The mounting inlet 16 is provided at one end of the mounting groove 14. More specifically, the mounting inlet 16 provides for the connector 30 to be mounted into the mounting groove 14 along a radial direction of the connector 30. Correspondingly, the mounting inlet 16 extends through an end wall 13 of the support body 12.

The support 10 further comprises a blocking wall 17. The blocking wall 17 is disposed at the other end of the mounting groove 14. The blocking wall 17 is provided to be block-fittable with a mounting part 31 of the connector 30. Specifically, when the connector 30 is mounted into the mounting groove 14, the blocking wall 17 may block the mounting part 31 from continuing moving along the mounting direction of the mounting part 31, thereby allowing the mounting part 31 to be held within the mounting groove 14. It can be understood that the direction from one end of the mounting groove 14 to the other is the mounting direction of the connector 30.

To further conveniently enhance the performance of the support 10 to securely hold the connector 30 integrally, the support 10 further comprises a blocking arm 18. The blocking arm 18 is provided on the support body 12 and protrudingly extends into the mounting groove 14. The blocking arm 18 may be in radial block-fit with the connector 30 to block the connector 30 from disengaging from the mounting groove 14. The specific extension length and protrusion length of the blocking arm 18 are only required to enable the connector 30 to be radially blocked. In this embodiment, the blocking arm 18 is provided along the entire extension path of the groove wall of the mounting groove 14.

Figure 4:
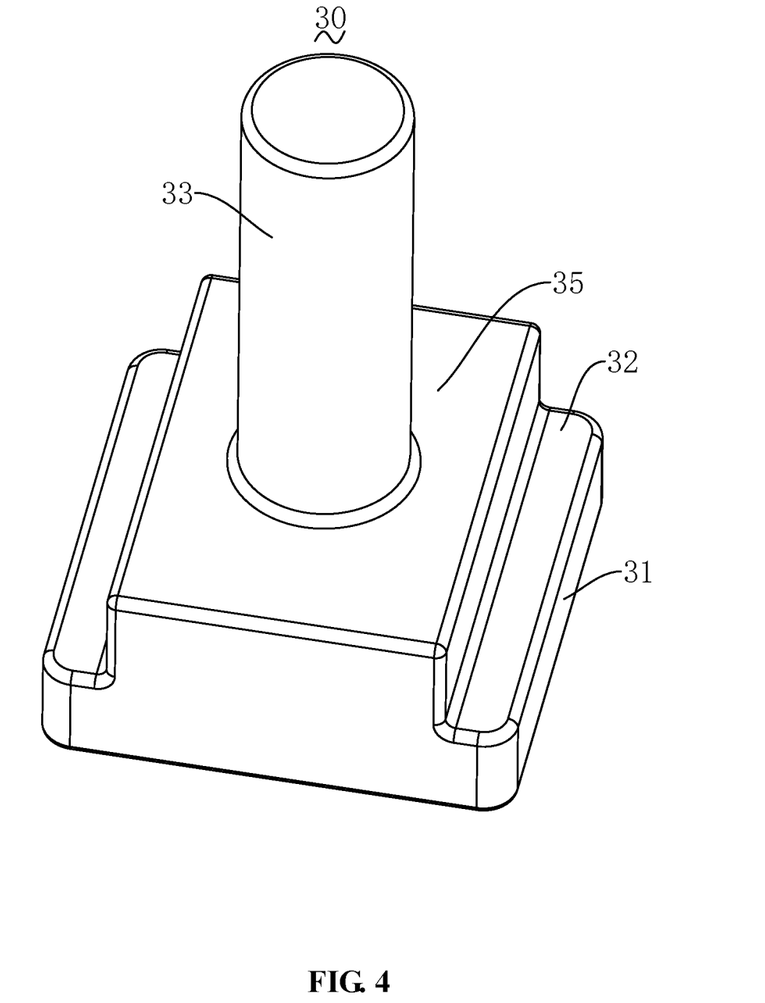
FIG. 4 is a stereoscopic structural schematic diagram of a connector in FIG. 1.
Figure 5:
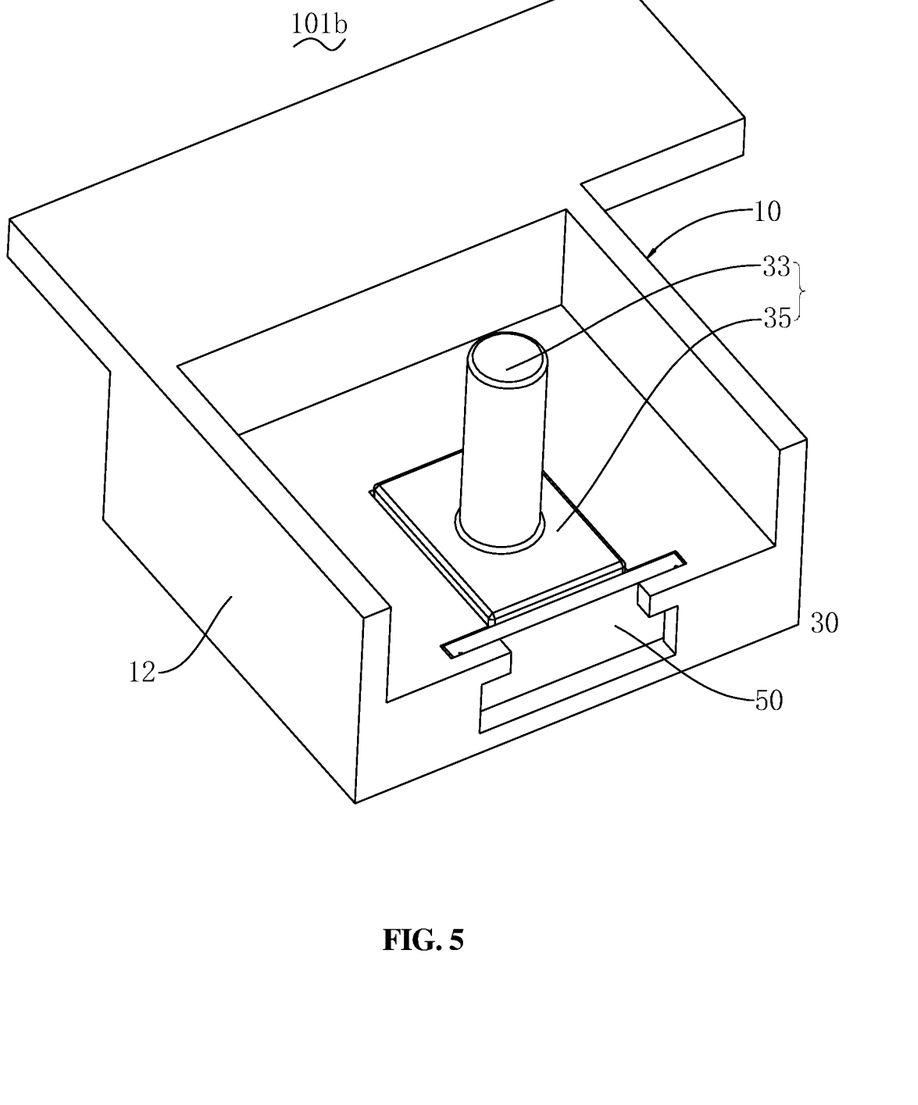
FIG. 5 is a stereoscopic structural schematic diagram of another embodiment of the electric connection assembly of FIG. 1.

To facilitate mounting and holding a non-return plate 50 described below, the support body 12 is provided with a limiting groove 19. The limiting groove 19 extends along the inserting and mounting direction of the non-return plate 50. That is, the limiting groove 19 is provided to extend along the radial direction of the connector 30. To further enhance the performance of the support 10 to securely hold the non-return plate 50, a pair of the limiting grooves 19 are disposed to face each other and hold the two side edges of the non-return plate 50, respectively. Referring to FIGS. 4 and 5, to further enhance the performance to securely hold the non-return plate 50 and facilitate dismantling the non-return plate 50, the limiting groove 19 is enclosed by a limiting groove wall 192. Moreover, an abutting convex rib 194 is provided to protrude on the limiting groove wall 192. The abutting convex rib 194 may abut against the non-return plate 50. Specifically, the abutting convex rib 194 abuts on the non-return plate 50 along a mounting direction perpendicular to the non-return plate 50. In this embodiment, the abutting convex rib 194 abuts against the non-return plate 50 along the radial direction of the connector 30. That is, the abutting convex rib 194 is provided to be in interference-fit with the non-return plate 50.

In order to facilitate manufacturing and to provide better electrical insulation performance, the support 10 is an injection molded part. The support 10 is one integral piece. That is, the support 10 is formed as one integral piece by injection molding.

Referring to FIG. 4, the connector 30 is provided on the support 10 and may be connected to a corresponding mating connector 70. The connector 30 is mounted into the mounting groove 14. Specifically, the connector 30 comprises a mounting part 31 and a protruding part 33. The mounting part 31 is received within the mounting groove 14. The specific shape and configuration of the mounting part 31 are only required to be receivable in the mounting groove 14. In this embodiment, the mounting part 31 is substantially block-shaped. More specifically, the mounting part 31 is in a cuboid block shape. Part or all of the mounting part 31 is detachably received in the mounting groove 14 to facilitate the application. Further, to facilitate the connector 30 to be assembled with the mating connector 70 described below, the mounting part 31 is in clearance-fit with the groove wall of the mounting groove 14. That is, the mounting part 31 is enabled to move within a corresponding limit in the mounting groove 14, so as to facilitate the connector 30 to move to a position for mating with the mating connector 70.

To be in block-fit with the blocking arm 18 of the support 10, the mounting part 31 is provided with a stop step 32. The stop step 32 may be in block-fit with the blocking arm 18 along the radial direction of the connector 30, thereby to block the connector 30 from axially disengaging from the mounting groove 14. The stop step 32 extends over a full circle along the circumferential direction of the connector 30.

The protruding part 33 is provided to extend from the mounting part 31 along the radial direction of the connector 30. That is, the protruding part 33 is protrudingly provided on the mounting part 31. The protruding part 33 is configured to limit and hold the mating connector 70. The protruding part 33 may be in any shape and configuration. In this embodiment, the protruding part 33 is substantially cylindrical.

To enhance the performance of supporting and contacting the mating connector 70, the protruding part 33 has a smaller radial size than that of the mounting part 31. Correspondingly, the mounting part 31 is disposed radially protrudingly with respect to the protruding part 33 to form a supporting step 35. The supporting step 35 is arranged for supporting the mating connector 70. In this embodiment, the supporting step 35 is provided as an annular step. The supporting step 35 is provided to protrude from the supporting body 10. The supporting step 35 is provided to protrude out of the mounting groove 14. More specifically, the supporting step 35 is provided to protrude radially with respect to a top face of the blocking arm 18.

To facilitate manufacturing, the connector 30 is one integral piece. Specifically, the connector 30 is metallic. In this embodiment, the connector 30 comprises a bolt. Correspondingly, the connector 30 and the support 10 are separately and individually formed and mutually separable parts, and are mounted and connected together in the manner described above.

Embodiment 2

Referring to FIG. 5, the present disclosure further provides an electric connection assembly 101*b*. In this embodiment, to further enhance the performance of the support 10 to securely hold the connector 30, the electric connection assembly 101*b* further comprises a non-return plate 50. Part of the non-return plate 50 is inserted into the limiting groove 19 of the support 10. The non-return plate 50 extends into the mounting inlet 16 and may be in block-fit with the connector 30 so as to block the connector 30 from retreating out of the mounting groove 14. The shape and configuration of the non-return plate 50 are only required to be capable of blocking the connector 30. In this embodiment, the non-return plate 50 is substantially in a rectangular flat plate shape. To enhance the performance of blocking the connector 30 as much as possible, the two side walls of the non-return plate 50 are provided to be inserted into a pair of the limiting grooves 19 disposed opposite to each other to completely block the mounting inlet 16. The non-return plate 50 is detachably provided inside the limiting groove 19 so as to facilitate dismantling and mounting. Further, the non-return plate 50 is disposed to abut against the abutting convex rib 194 in the limiting groove 19. The non-return plate 50 is inserted and mounted into the limiting groove 19 from the radial direction of the connector 30.

Embodiment 3

Figure 6:
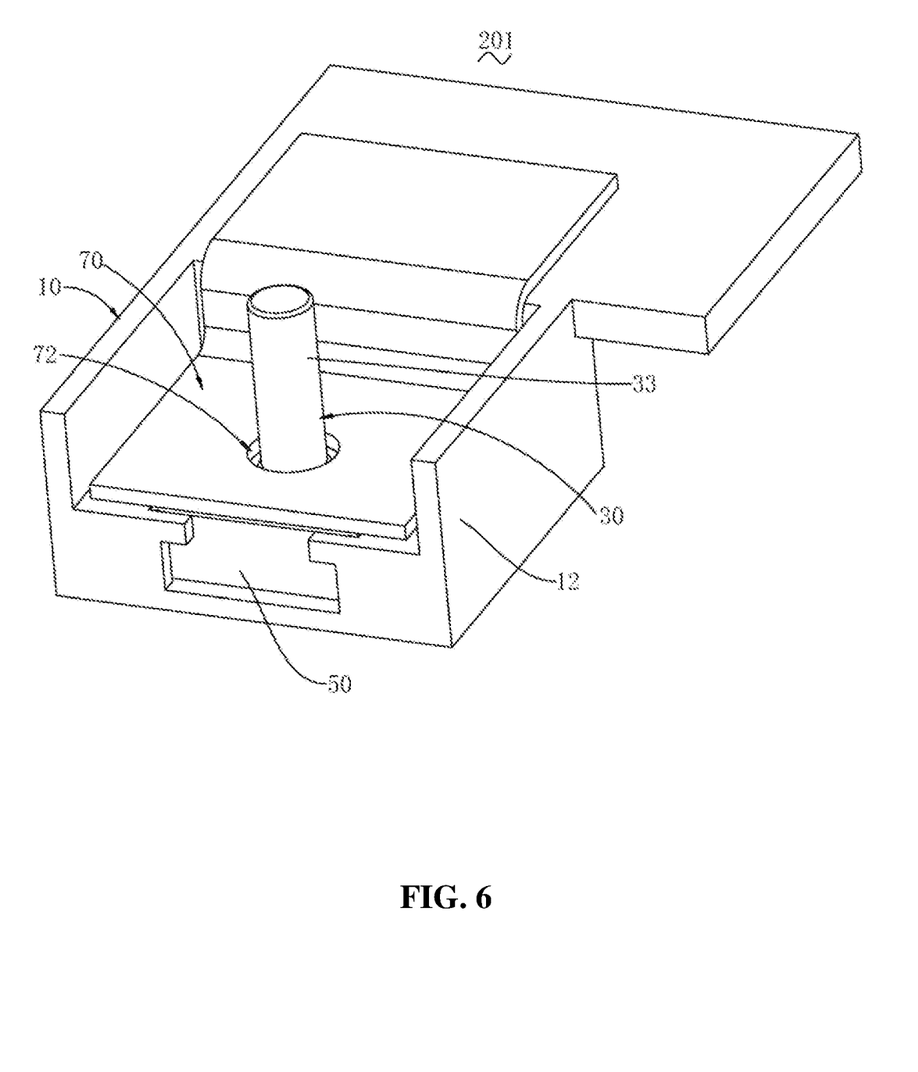
FIG. 6 is a stereoscopic structural schematic diagram of a further embodiment of the electric connection assembly of FIG. 1.
Figure 7:
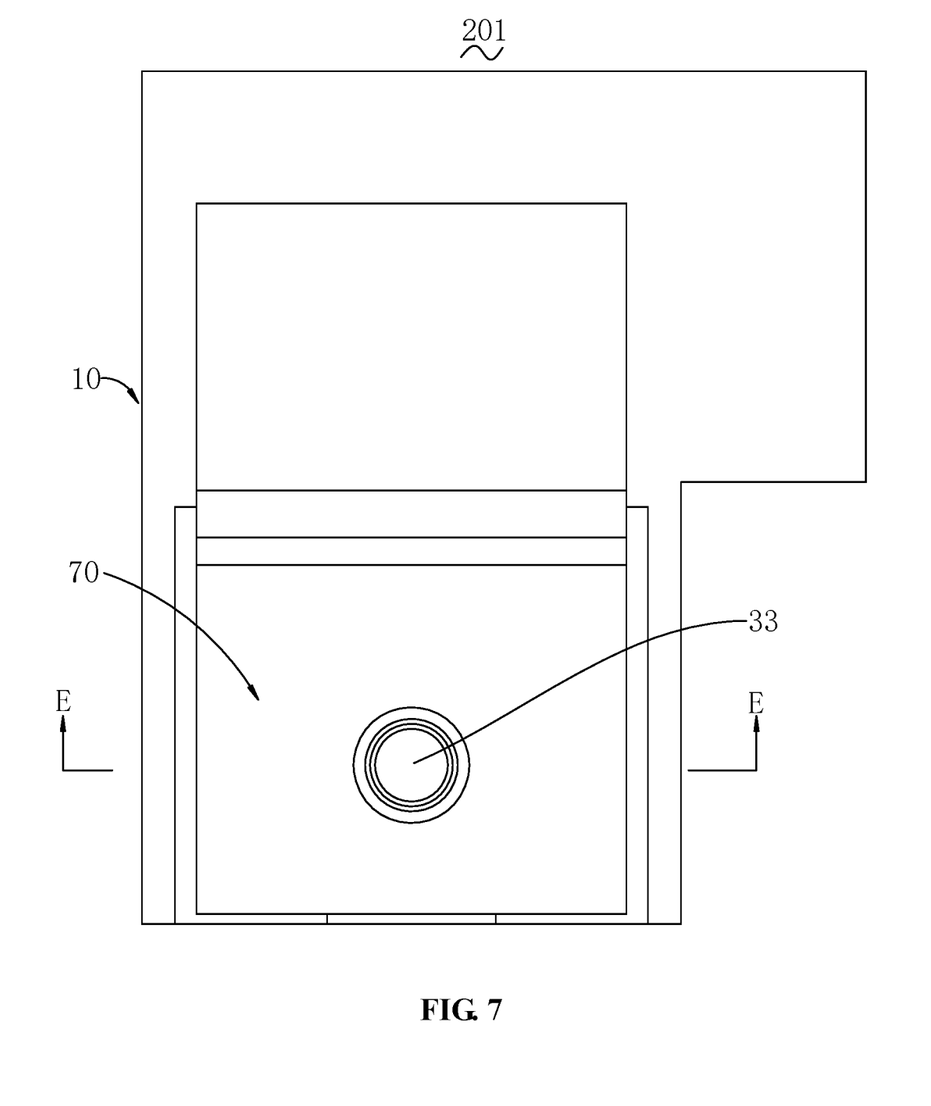
FIG. 7 is a projection schematic view of the electric connection assembly of FIG. 6.
Figure 8:
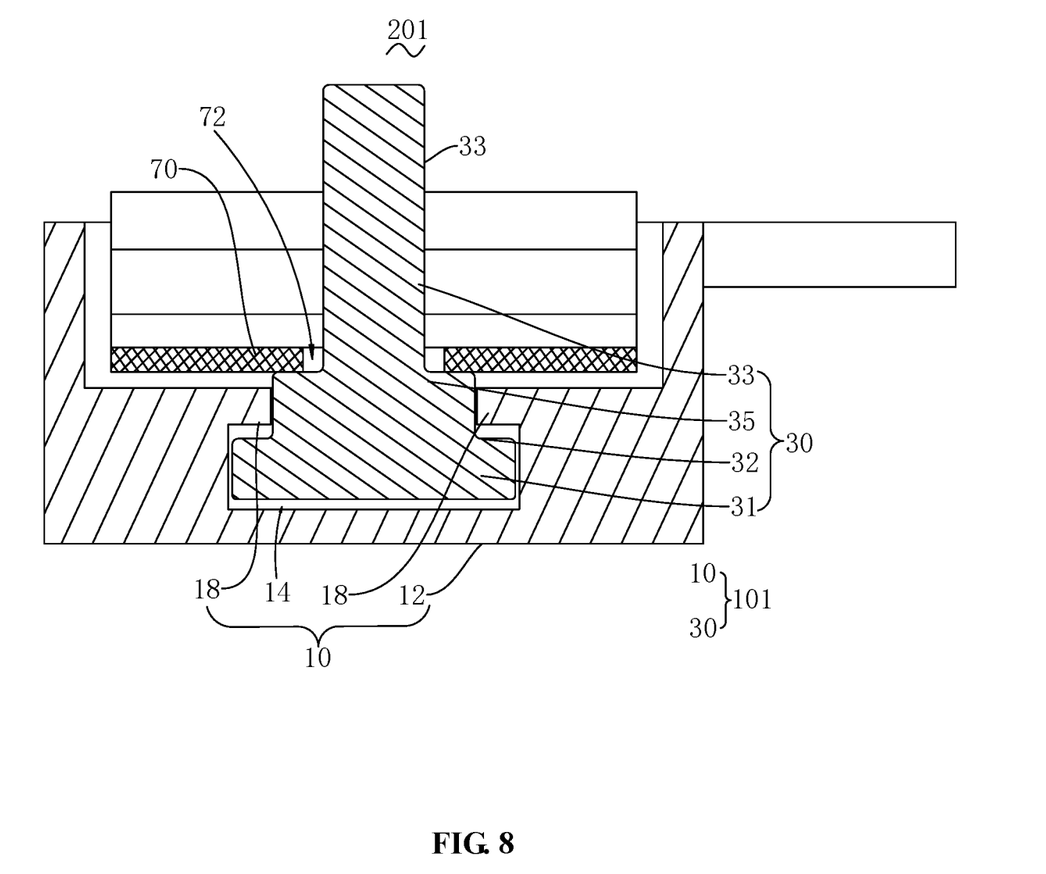
FIG. 8 is a sectional view of the electric connection assembly of FIG. 7 along line E-E.

Referring to FIGS. 6 to 8, the present disclosure further provides an electric connection assembly 201. The electric connection assembly 201 comprises a mating connector 70 and the electric connection assembly 101 described above.

The mating connector 70 is electrically connected to the connector 30. The specific specification, type, and structure of the mating connector 70 may be selected according to needs, so long as a corresponding electrical connection is enabled. In this embodiment, the mating connector 70 is configured for electrically connecting the cells (not shown in the figures). The mating connector 70 may be electrically connected to the connector 30 in any forms. In this embodiment, to enhance the stability performance of the electric connection between the mating connector 70 and the connector 30, the mating connector 70 has a mounting through-hole 72. The mounting through-hole 72 is disposed to extend through along the radial direction of the connector 30. The mating connector 70 is mounted onto the protruding part 33 of the connector 30 via the mounting through-hole 72. Namely, the mating connector 70 is sleeved onto the protruding part 33. That is, the protruding part 33 extends through the mounting through-hole 72. To enhance the current transmission performance, in this embodiment, the mating connector 70 is a busbar. More specifically, the mating connector 70 may be a Cu—Al bimetallic structure, thereby enhancing the anti-corrosion performance. In this embodiment, the output connector 80 is a busbar. A plurality of the busbars are electrically connected to the corresponding cells, respectively. One of the busbars is electrically connected to the connector 30.

Embodiment 4

Figure 9:
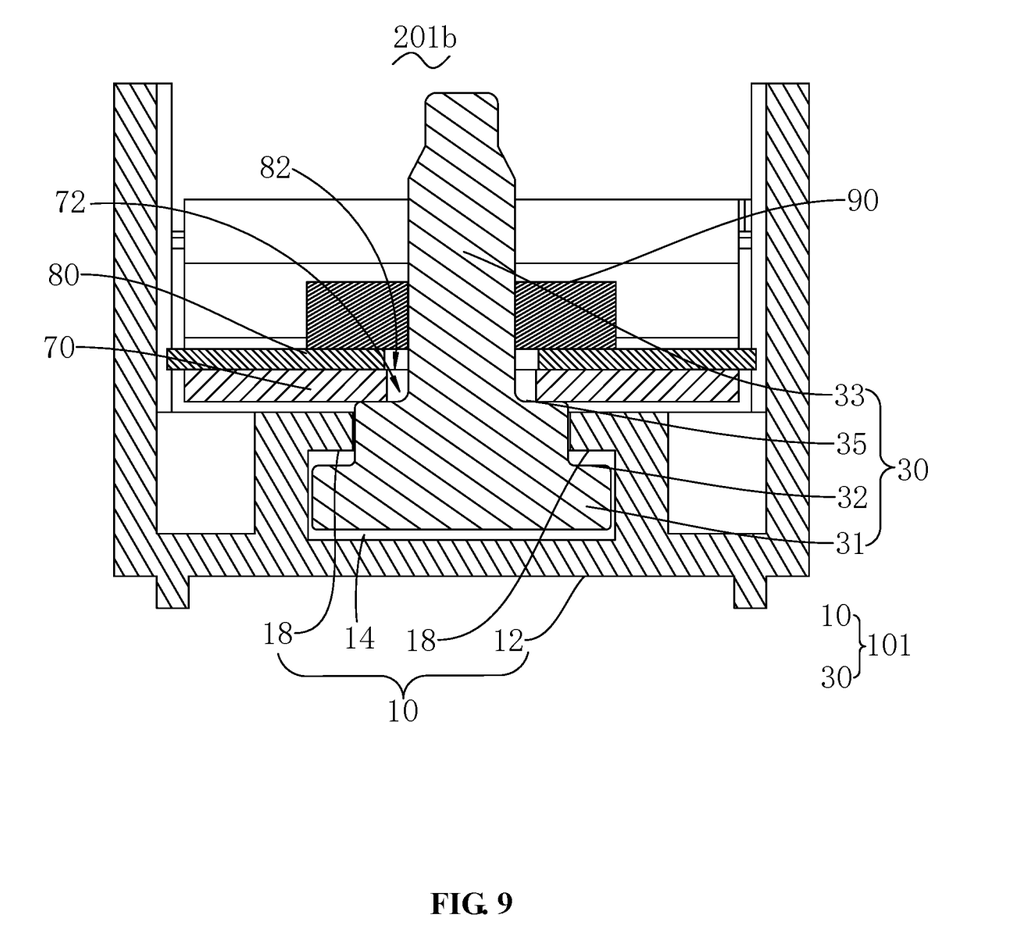
FIG. 9 is a sectional view of a still further embodiment of the electric connection assembly of FIG. 1.

Referring to FIG. 9, the present disclosure further provides an electric connection assembly 201*b*. Different from the above electric connection assembly 201, to facilitate outputting the corresponding electric energy and/or electric signal, the electric connection assembly 201*b* further comprises an output connector 80. The output connector 80 is electrically connected to the mating connector 70. The output connector 80 may implement an indirect electric connection with the mating connector 70 via the connector 30. In this embodiment, the output connector 80 is in direct contact electrical connection with the mating connector 70. The specific type and shape of the output connector 80 are only required to enable a corresponding electric connection. To enhance the stable electric connection performance between the output connector 80 and the mating connector 70, the output connector 80 is provided with a limiting through-hole 82. The output connector 80 is sleeved onto the protruding part 33 of the connector 30 via the limiting through-hole 82. That is, the protruding part of the connector 30 extends into and through the limiting through-hole 82 of the output connector 80.

The output connector 80 may be electrically connected to a cell supervision circuit (CSC), a cell management unit (CMU) or a battery management system (BMS) to transmit corresponding electric signals and/or currents.

To further enhance the stable electric connection between the output connector 80 and the mating connector 70, the electric connection assembly 201 further comprises a fastener 90. The fastener 90 is disposed on the protruding part 33 of the connector 30. The fastener 90 is configured to abut against the output connector 80 and to allow the output connector 80 to abut against the mating connector 70. In this embodiment, to facilitate assembling, the fastener comprises a nut. Correspondingly, the connector 30 comprises a bolt. The fastener 90 is integrally fastened to and fitted with the protruding part 33 of the connector 30 via threads. In a preferred embodiment, the connector 30 is an insert injection molded part, in which the protruding part 33 is the insert. The protruding part 33 may be a metal bolt, such as a standard bolt.

Embodiment 5

The present disclosure further provides a battery module (not shown in the figures). The battery module comprises a cell and the electric connection assembly 201 (or 201*b*) as described previously. The cell is also referred to as an individual cell of a lithium battery. The number of the cell may be selected according to needs. In general, each of the battery modules comprises a plurality of the cells. As needed, the battery module may adopt a corresponding housing to support the cell. The mating connector 70 is configured to be electrically connected to the cells.

It should be noted that the terms "upper, lower", "left, right", "front, rear" and the like mentioned in the present disclosure are all relative orientation concepts, and are only intended in conjunction with the exemplary drawings to facilitate understanding the relative orientations of various components. Herein, the terms "an axial direction of the connector 30" and "a mounting direction of the non-return plate 50" refer to an up-and-down direction in FIGS. 8 and 9. Correspondingly, the term "a radial direction of the connector 30" refers to a direction perpendicular to the axial direction.

The embodiments described above are only preferred embodiments of the present disclosure, and are not intended to limit the protection scope of the present disclosure. Any modifications, equivalent alternatives or improvements within the spirit of the present disclosure shall be covered within the scope of the claims of the present disclosure.

What is claimed is:

1. An electric connection assembly comprising:
   a support comprising a support body that is provided with a mounting groove; and
   a connector configured to be in contact electrical connection with a mating connector, the connector having a longitudinal axis;
   wherein the connector comprises a mounting part and a protruding part configured to limit and hold the mating connector;
   wherein the mounting part is detachably received within the mounting groove along a radial direction of the connector, the radial direction being perpendicular to the longitudinal axis of the connector, the mounting part is clearance-fit in the mounting groove to allow the mounting part to move in the mounting groove when the connector is fully assembled to the support body; and
   wherein the support and the connector are formed separately and connected to each other, the mounting part cooperating with the support body to prevent the connector from disengaging from the support body in the radial direction of the connector or an axial direction of the connector, and to allow the connector to move relative to the support body when the connector is fully mounted to the support body to a position for mating with a mating connector.

2. The electric connection assembly of claim 1, wherein the support body is provided with a mounting inlet at one end of the mounting groove, and the mounting inlet is configured to provide for the connector to be mounted into the mounting groove.

3. The electric connection assembly of claim 2, further comprising a non-return plate provided on the support body, wherein the non-return plate is configured to extend into the mounting groove and to be block-fittable with the connector to block the connector from retreating out of the mounting groove via the mounting inlet.

4. The electric connection assembly of claim 3, wherein the non-return plate is detachably provided on the support body.

5. The electric connection assembly of claim 3, wherein the support body is provided with a limiting groove; and at least part of the non-return plate is inserted and fixed into the limiting groove.

6. The electric connection assembly of claim 5, wherein the limiting groove is enclosed by a limiting groove wall;
   the limiting groove wall is provided protrudingly with an abutting convex rib; and
   the abutting convex rib is provided to be in interference-fit with the non-return plate.

7. The electric connection assembly of claim 2, wherein the support body is provided with a blocking wall at another end of the mounting groove, and the blocking wall is configured to be in block-fit with the mounting part along a mounting direction of the mounting part.

8. The electric connection assembly of claim 1, wherein the support further comprises a blocking arm; the blocking arm is provided to be block-fittable with the mounting part along the axial direction of the connector.

9. The electric connection assembly of claim 8, wherein the mounting part is provided with a stop step, and the stop step is provided to be block-fittable with the blocking arm along the axial direction of the connector.

10. The electric connection assembly of claim 1, wherein the connector is provided to be movable inside the mounting groove.

11. The electric connection assembly of claim 1, wherein the mounting part is in clearance-fit with a groove wall of the mounting groove.

12. The electric connection assembly of claim 1, wherein the support is an injection molded part.

13. The electric connection assembly of claim 1, wherein the connector comprises a bolt.

14. The electric connection assembly of claim 1,
    the protruding part is provided to protrude on the mounting part along the axial direction of the connector.

15. The electric connection assembly of claim 14, wherein the connector further comprises a supporting step disposed along the radial direction of the connector to contact and support the mating connector.

16. The electric connection assembly of claim 1, wherein the support is a battery module cover plate.

17. The electric connection assembly of claim 1, further comprising a plurality of mating connectors, wherein the mating connectors are busbars that are fixed on the support body and configured to be electrically connected to a plurality of cells, and one of the plurality of busbars is electrically connected to the connector.

18. The electric connection assembly of claim 17, further comprising: an output connector that is in contact electrical connection with at least one busbar of the busbars; and a fastener that is securely provided on the connector and allows the at least one busbar and the output connector to abut against and connect with each other.

19. The electric connection assembly of claim 1, wherein the connector is one integral piece.

20. The electric connection assembly of claim 19, wherein the connector is an insert injection molded part.

* * * * *